(No Model.)
J. T. BELDEN.
ANIMAL TRAP.
No. 385,086. Patented June 26, 1888.
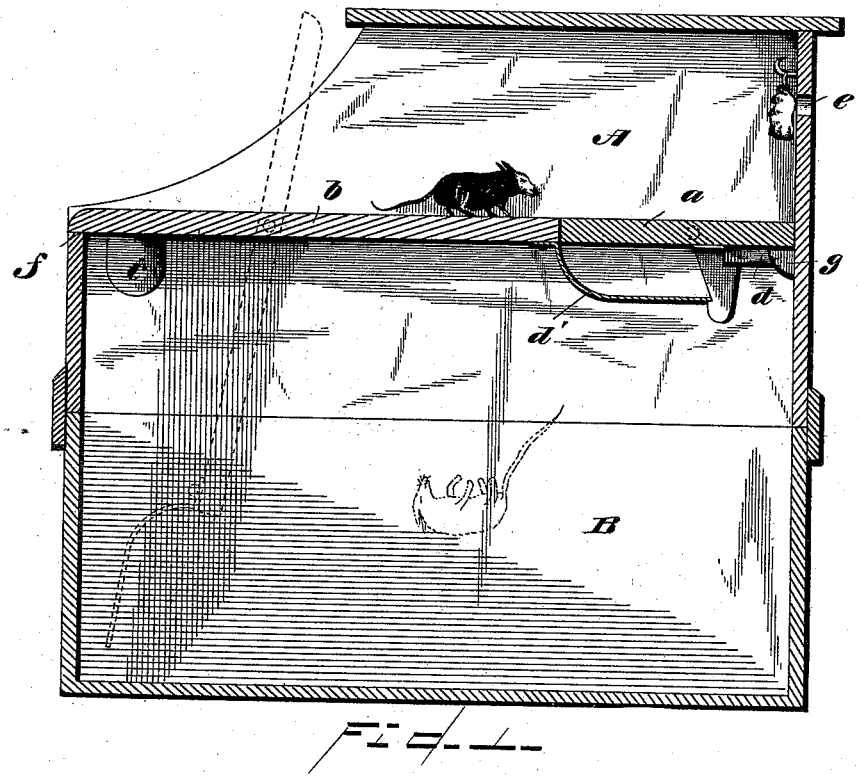
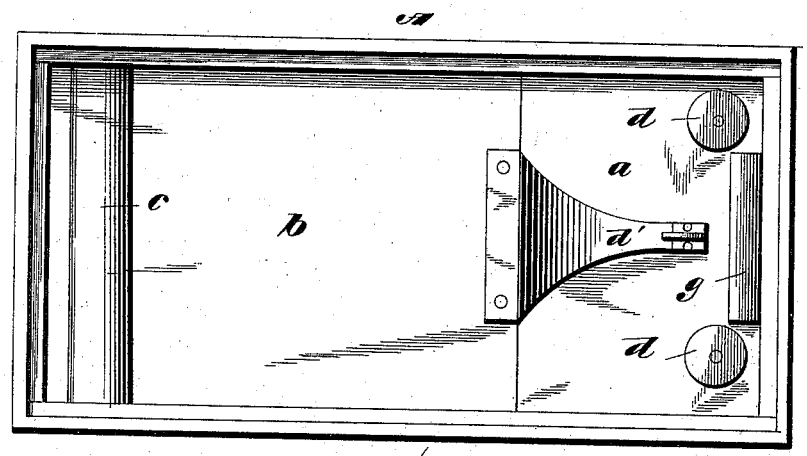
WITNESSES.
INVENTOR.
J. T. Belden.
By James J Sheehy
Attorney.

UNITED STATES PATENT OFFICE.

JAMES TRITEN BELDEN, OF SPARTA, WISCONSIN.

ANIMAL-TRAP.

SPECIFICATION forming part of Letters Patent No. 385,086, dated June 26, 1888.

Application filed April 12, 1888. Serial No. 270,459. (No model.)

*To all whom it may concern:*

Be it known that I, JAMES TRITEN BELDEN, a citizen of the United States, residing at Sparta, in the county of Monroe and State of Wisconsin, have invented certain new and useful Improvements in Animal-Traps; and I do declare the following to be a full, clear, and exact description of the invention, such as will enable others skilled in the art to which it appertains to make and use the same.

This invention has relation to improvements in animal-traps; and the novelty consists in the peculiar combination, arrangement, and adaptation of the various parts, as will be hereinafter fully described and claimed.

The object of my invention is to provide a device of the class above named which shall consist of double trapping doors or platforms suitably constructed, whereby the entrapped animal will be precipitated into a vessel of water or other suitable destroying device. I attain these objects by the mechanism illustrated in the accompanying drawings, in which—

Figure 1 is a vertical longitudinal sectional view of my improved trap, showing one of the platforms or doors tripped; and Fig. 2 is a bottom plan of the top section composing the trap.

Referring by letter to the said drawings, A B designate, respectively, the upper and lower sections of the box or casing C of my improved device. This casing may be of any desired shape, but preferably rectangular, as shown in the drawings.

Midway the top and bottom of the casing A, I pivotally secure at suitable points the trip-doors $a b$, the latter being of greater length than its fellow. These doors are normally held in a horizontal plane by suitably-constructed weights, (marked $c d$,) and which also cause the said doors to swing back into proper position within the casing A after the animal has been dropped into the lower section or receptacle, B.

To the rear end of the trap-door $b$, and on the under side thereof, is suitably secured a downwardly-curved plate, $d'$. This plate is tapered and continued rearwardly in a horizontal plane, and the free end thereof is adapted to engage a notch formed in a depending lug, which serves as a catch for the plate $d'$.

The lower portion of the box or casing A may be provided with a depending flange or skirting, which is for the purpose of adapting the said casing A to fit snugly over the upper edge of the water-receptacle B.

Above the trap-doors $a b$, and at a suitable point in the forward wall of the casing A, I provide an opening, $e$, through which the necessary bait is displayed on the outside of the trap at that point.

It will be observed that the trap-doors form substantially a false bottom, the outer edges of said doors being adapted to rest upon suitable ledges or stops, $f g$. The forward portion of the casing A above the false bottom is left open to provide an entrance for the animals.

The operation of my invention is as follows: The whole device is placed in the required locality for the reception of the animals and the trap-doors set, as shown in solid lines, Fig. 1. It will be seen that the bait is visible both from the front and rear of the box. In case the animal first sees the bait from the rear he will in all probability advance to the front entrance of the box upon the trap-doors and almost within reach of the bait, when, by reason of the catch-plate $d'$ disengaging itself from the adjacent notch in the lug, the animal will be immediately precipitated into the receptacle B, as shown in dotted lines, Fig. 1. After the animal has fallen the weights upon the doors will instantly cause the latter to resume their former position within the box or casing A. It will be understood that the catch between the end of the plate $d'$ and the notch is of so delicate a construction that the plate $d'$ will become instantly released from the notch as soon as an animal almost touches the forward trap-door.

The bait may be hung upon a hook suitably secured to the rear wall of the casing, or in any way preferable.

I do not desire to limit myself to the construction of the receptacle below the casing A, as it is obvious that an ordinary tub of water or other suitable destroying device will perform the same function; and I do not, furthermore, desire to limit myself to the exact construction of various other parts of my invention, as I am aware that changes therein can be made without departing from the spirit or gist of my invention.

It will be further observed that the trap-doors b a drop independently of each other, and in the event of the forward door, b, failing to drop the animal as the latter approaches the bait the rear door, a, will fall as soon as the animal lands upon it.

Having thus fully described my invention, what I claim as new is—

The animal-trap herein described, consisting of the upper and lower sections, A B, the upper section having its entire bottom or floor composed of two tilting parts, a b, each having a weight on its outer under side, and the section a having a notched depending lug, and the section b having the downwardly-curved plate d', adapted to engage the notch on the lug of the said adjacent section, substantially as specified.

In testimony whereof I affix my signature in presence of two witnesses.

JAMES TRITEN BELDEN.

Witnesses:
W. M. GRAHAM,
C. F. GILLETTE.